DOUGLASS & WALTON.
Carbureter.
No. 61,656. Patented Jan. 29, 1867.
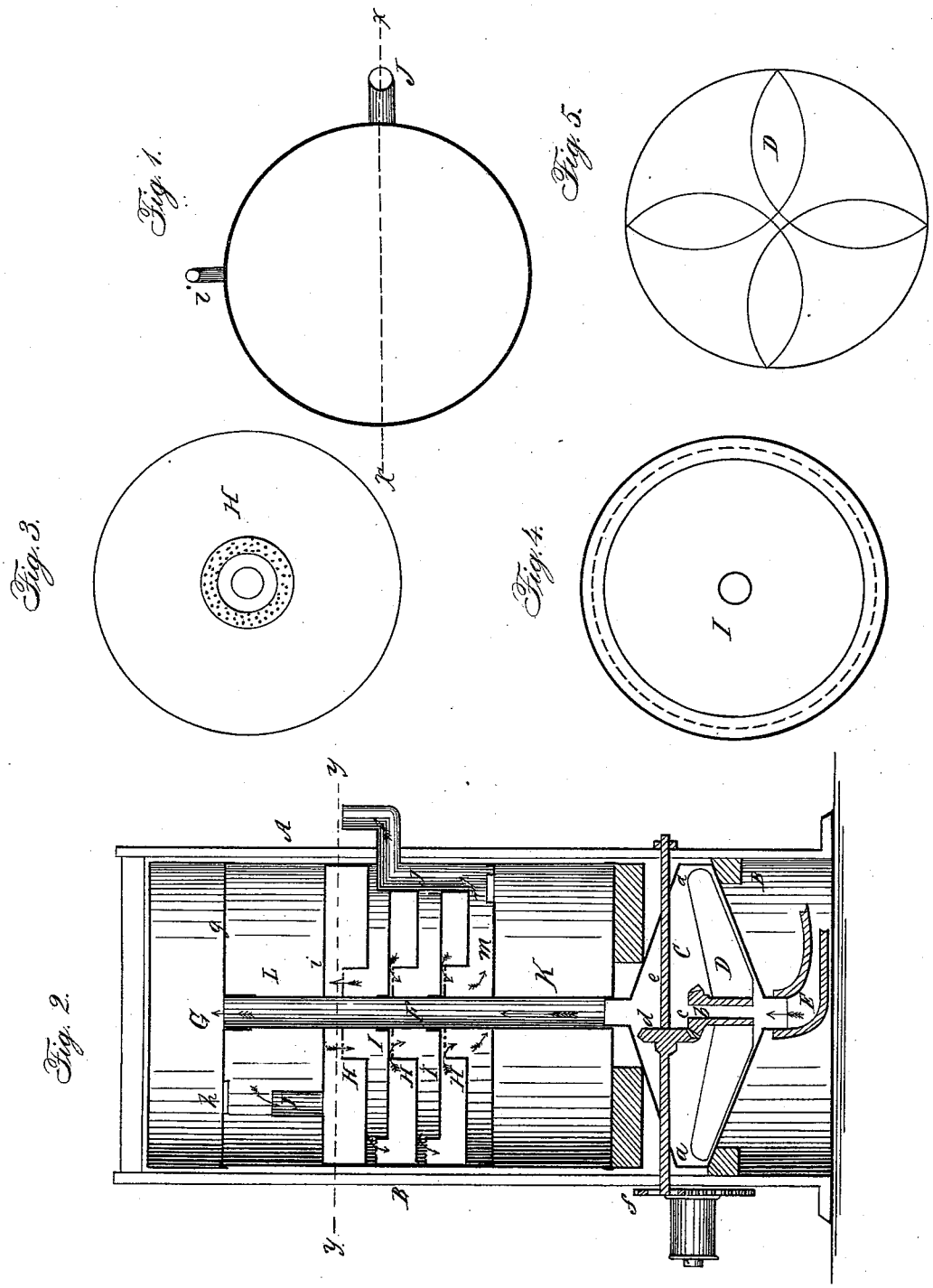

United States Patent Office.

BERNARD DOUGLAS, OF NEW YORK, AND WILLIAM H. WALTON, OF BROOKLYN, NEW YORK.

Letters Patent No. 61,656, dated January 29, 1867.

IMPROVED APPARATUS FOR CARBURETTING AIR.

*The Schedule referred to in these Letters Patent and making part of the same.*

TO ALL WHOM IT MAY CONCERN:

Be it known that we, BERNARD DOUGLAS, of the city, county, and State of New York, and WILLIAM H. WALTON, of Brooklyn, in the county of Kings, and State of New York, have invented certain new and useful Improvements in Apparatus for Carburetting Air or Gaseous Matter; and we do hereby declare the following to be a full, clear, and exact description of the same, sufficient to enable others skilled in the art to which it appertains to construct and use the same, reference being had to the accompanying drawings, making part of this specification, in which—

Figure 1 is a plan or top view of our invention, a section being made in line $y\,y$, fig. 2.

Figure 2 is a transverse vertical section of the same taken in the line $x\,x$, fig. 1.

Figures 3 and 4 are plan or top views of the carburetting pans or chambers.

Figure 5 is a plan or top view of the fan.

Similar letters of reference indicate corresponding parts in the several figures.

Our invention relates to a new and improved device for impregnating air or other gases with hydrocarbon vapor for illuminating purposes, and consists in an apparatus of peculiar construction, as will be hereinafter more fully described.

A represents a close cylinder, secured within a suitable frame, B, which supports the apparatus. Near the bottom of the frame there is a fan-chamber, C, consisting of two truncated cones, united at their bases by a rim, $a$, as shown in fig. 2. This chamber receives a fan, D, of ordinary construction, in this case of a screw-propeller form, its lower side sweeping the bottom of the chamber. The fan is suitably mounted on a shaft, $b$, to the upper end of which is secured a bevel-wheel, $c$, which engages with a corresponding wheel, $d$, on a horizontal shaft, $e$, which passes through the upper part of the chamber, and has its bearing on the frame B. One end of this shaft is provided with a toothed wheel, $f$, which meshes with another wheel, operated by clock mechanism, or other suitable power. To the lower part of the fan-chamber there is fitted a pipe, E, through which air is introduced into the apparatus. On the upper side of the fan-chamber arises a vertical tube, F, and extends to the top of the cylinder. Just below the top of this tube a disk, $g$, is secured within the cylinder, having an opening in its centre to receive the tube F, and another one, $h$, near its side for the passage of air. The space between this disk and the top of the cylinder forms an air-chamber, G, and receives the air after being forced into the apparatus by the fan D. At a proper distance below the disk $g$ is placed another disk, $i$, forming a chamber, L, and having an opening through which the tube F passes, and an opening terminating upwards in a short pipe, $j$, through which the hydrocarbon liquid passes to the parts of the apparatus below it. At one side of the frame is a supply pipe, $l$, which connects with the cylinder, and is adapted to supply the apparatus with hydrocarbon liquid from any receiver or supply vessel. The carburetting chambers consist of a series of removable trays or pans, H and I, arranged one above the other. H represents the first pan placed below the disk $i$. It consists of an ordinary pan, having a collar at its centre to allow the passage of the tube F, and having a series of perforations at its centre, the use of which will be explained more fully hereafter. I represents the tray placed next in order. It is of the same construction as the other pan, excepting that the perforations are near the rim, and has the central opening through which the tube F passes. These pans are readily removable, the advantage of which is evident, and are arranged alternately within the cylinder A. The lowest pans have an additional opening at one side, through which passes a pipe, J, which connects with the burners or pipes which are within the walls and ceilings of the house in which the apparatus is being used. This pipe J is placed about the middle of the cylinder, as shown in fig. 2. Between the lower tray and the bottom of the cylinder is secured a disk, $m$, having an opening at one side, and forming a receptacle or chamber, K, to receive the liquid which overflows from the trays above. A small faucet is placed at the bottom of the cylinder connecting with this chamber, and allows the liquid to be drawn off whenever desired.

The operation is as follows: A suitable quantity of hydrocarbon liquid is introduced through the supply pipe $l$ into the chamber L, and, filling the same, will overflow and pass through pipe $j$ into pan H, and after filling the same overflows and passes through the perforations at the centre of the pan into pan I below it; when said pan is full and overflowing, it will pass through its side perforations into the pan H below it, and so on alternately through the whole series, when, having filled the lowest pan, the liquid will drop into chamber K, and remain there until it is necessary to remove it. The fan is set in motion, and air or other gaseous material is introduced through pipe E, which will pass through the fan-chamber, being sucked therein and then forced upwards through the central tube F into the air-chamber G. The air then passes through the opening $h$ in disk $g$, and over the surface of the hydrocarbon liquid in chamber L, and, absorbing its vapor, descends through pipe $j$ into the space below, over the liquid in tray H, escaping through the perforations near the centre into the space below over the liquid in tray I, when, absorbing its vapor, it will escape through the side perforations, and so on zigzag through the entire series, and then pass out through the side pipe J to the burner, or where desired. The cylinders and fan-chamber are air-tight, having no openings at any part except where necessary. Should the pans become worn from use, and it be desirable to remove them, it can be readily done without disturbing any of the internal parts of the cylinder.

We use warm air to generate gas from hydrocarbon liquid in all climates where the thermometer ranges below 60° Fahrenheit. We use the warm air without the direct application to the apparatus of fire, steam, heated iron, or other metals, which are objectionable at all times on account of the danger, ineffectiveness, and trouble they entail. The peculiar construction and arrangement of the generating fans, in connection with the cylinder, admit of the production of a larger volume of gas in a small cylinder than could be accomplished otherwise, for the air is compelled to pass directly over the entire surface of the hydrocarbon liquid contained in the pans, it being a well-known principle that air or vapor will seek to escape through and in the shortest means left or opened to it. The fan not only introduces the heated air into the cylinder, but also forces the generated gas through the apparatus into and out of the escape pipe; and thus we are enabled to introduce the gas into the most elevated parts of dwellings, stores, or factories, or other buildings, regardless of the position of the apparatus. The supply pipe is closed by its connection with a supply can, and is provided with a stop-cock. The escape pipe is connected to the burners, and we therefore produce an air-tight and fire-proof device which, in consequence of explosions daily occurring in differently constructed apparatus, is an important feature of our invention. Besides this, we prevent any unnecessary evaporation of the hydrocarbon liquid while supplying the apparatus, and prevent accidents from occurring should light be desired during the night, or a careless or ignorant person meddle with the device at improper times. To facilitate the introduction of warm air, a funnel or flaring mouth-piece may be secured to the end of the tube E, although this is not extremely essential to the successful operation of the machine.

The portability of the whole apparatus admits of ready removal and lodgment, when and where desired, and it will operate equally well regardless of the distance of the place of supply of warm air, whether steam can be obtained or not. Gas manufactured from hydrocarbon liquids being much heavier than ordinary gas or air, it is requisite that there should be a stronger power employed to set it in motion, or to raise it above its own level; therefore the using of a strong motive power is of vital importance. In order to adapt this gas or mode of illumination to all climates and at all seasons, we apply, in connection with the introducing of warm or heated air, the same power that introduces the heated air, as a medium to raise this gas above its specific gravity, which is very limited by its laws, and to force it into the most elevated burners. Moreover we use our gas in dwellings or places where gas pipes of the ordinary description are already in existence—the removal or reversing of which forming always an obstacle in the application of automatic gas machines, as it is well known that pipes laid for the use of ordinary gas are so constructed as to increase the pressure by contracting them as they ascend; whereas gas cannot be led through the same when the apparatus is placed in the upper part of the house, to be brought down from the narrower part of the pipes above to the larger one below, for the reason of the reversed pipes as afore stated. We use heated air for the various reasons cited, furthermore, because a burner in any part or chamber could naturally not be lighted out of its order without first creating or introducing warm or heated air into the generator, at certain seasons and in various climates in any habitation, however humble, where steam cannot be obtained. The carburetted hydrocarbon gas, being generated from oily elements, that is, its organization is a most heterogeneous fluid, which, by a strong force of fundamental law, offers greater resistance than ordinary gas, of which the articles of matter, such as tar and ammonia, have been removed and the volatile portions purified by fire and water. Its own weight or gravity is continually varying according to the different degrees of heat or cold, and the concurrence of other causes, such as pressure, currents, &c. Therefore, to raise this gas above its own level or gravity, heat is one of the powers by which it can be moved, and this power must be proportionate to its perpendicular attitude. We therefore construct our carburetters in such a manner that the air, at the same time that it generates the gas, by an equal pressure determines its motion, and is compelled alternately to pass directly over the whole surface and through all the parts of the hydrocarbon liquid contained therein, whereas, when otherwise constructed, the air must necessarily leave one portion of the liquid unaffected, as it would not diffuse itself over the whole expanse of the same, as, by its pneumatic principles and properties, air takes the shortest course to escape, it being a dilatable and the most sensitive of all compressible fluids, which, by reason of this sensitiveness, yields to the smallest change of pressure, and, its elasticity being increased, it rushes with greater violence toward and through the nearest point of outlet. It follows, therefore, that all other fluids must press equally every way, it being obvious that upon diminishing or decreasing the pressure towards its outlet on one side, the effect of the pressure, by contracting or expanding its dimensions, will determine the action by its gravity altered in its equilibrium.

Having thus described our invention, what we claim as new therein, and desire to secure by Letters Patent, is—

1. The removable pans H and I, in combination with the cylinder A, constructed and operating substantially as described.

2. We also claim the use of warm air, for the purpose described, without the direct application of fire or steam to the apparatus, substantially as specified.

3. We also claim the alternate arrangement of the generating pans H and I, in the manner described, for the purpose specified.

4. We also claim the apparatus so constructed that when the connecting parts of the pipes, which open into the atmosphere, are secured thereto, there will be no exposure to fire, and evaporation be prevented, as specified.

BERNARD DOUGLAS,
WILLIAM H. WALTON.

Witnesses:
L. D. GALE,
G. B. BENSON.